United States Patent
Ann et al.

(10) Patent No.: US 10,163,335 B2
(45) Date of Patent: Dec. 25, 2018

(54) DISPLAY APPARATUS, SYSTEM, AND METHOD FOR CONTROLLING AN EXTERNAL DEVICE

(71) Applicant: SAMSUNG ELECTRONICS CO., LTD., Suwon-si (KR)

(72) Inventors: Woo-ram Ann, Seongnam-si (KR); Cheul-hee Hahm, Seongnam-si (KR); Tae-young Lee, Suwon-si (KR); Joo-young Jung, Seoul (KR); Ki-hyeok Koo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/454,474

(22) Filed: Mar. 9, 2017

(65) Prior Publication Data

US 2017/0287321 A1  Oct. 5, 2017

(30) Foreign Application Priority Data

Apr. 1, 2016 (KR) .................. 10-2016-0040408

(51) Int. Cl.
 *G08C 17/02* (2006.01)
 *H04L 12/28* (2006.01)
 (Continued)

(52) U.S. Cl.
 CPC ............ *G08C 17/02* (2013.01); *H04L 12/282* (2013.01); *H04L 12/2814* (2013.01);
 (Continued)

(58) Field of Classification Search
 CPC ........... H04N 21/4126; H04N 21/4722; G08C 17/02; G08C 2201/30; G08C 2201/70;
 (Continued)

(56) References Cited

U.S. PATENT DOCUMENTS 8,850,348 B2 * 9/2014 Fadell ................ G05D 23/1902
 715/771
2011/0291971 A1 12/2011 Masaki et al.
 (Continued)

FOREIGN PATENT DOCUMENTS

| EP | 2717590 A1 | 4/2014 |
|---|---|---|
| EP | 2744216 A2 | 6/2014 |
| EP | 2940635 A1 | 11/2015 |
| JP | 201365465 A | 4/2013 |

(Continued)

OTHER PUBLICATIONS

Communication dated Aug. 7, 2017, from the European Patent Office in counterpart European Application No. 17161155.1.

*Primary Examiner* — Ali Neyzari
(74) *Attorney, Agent, or Firm* — Sughrue Mion, PLLC

(57) ABSTRACT

A display apparatus is provided. The display apparatus is configured to control at least one external device to which an identification marker is attached. The display apparatus also includes an imaging sensor configured to obtain an image of the at least one external device, and a communicator configured to perform communication with at least one of a server and the at least one external device. The display apparatus also includes a processor configured to transmit identification information obtained from an identification marker included in the image, and in response to control information for controlling the at least one external device being received from the server or the at least one external device, control the display to match and display an object for controlling the at least one external device with an external device image based on the control information.

6 Claims, 14 Drawing Sheets

(51) Int. Cl.
*H04N 21/41* (2011.01)
*H04N 21/4722* (2011.01)
*H04L 12/46* (2006.01)
*G06K 9/62* (2006.01)
*H04L 29/06* (2006.01)

(52) U.S. Cl.
CPC ..... *H04L 12/4625* (2013.01); *H04N 21/4126* (2013.01); *H04N 21/4722* (2013.01); *G06K 9/6201* (2013.01); *G08C 2201/30* (2013.01); *G08C 2201/70* (2013.01); *G08C 2201/92* (2013.01); *H04L 67/42* (2013.01)

(58) Field of Classification Search
CPC . G08C 2201/02; H04L 67/42; H04L 12/2814; H04L 12/282; H04L 12/4625; H05B 33/0863; H05B 37/0272; G05D 33/1902; G06K 9/6201
USPC .................................................. 340/12.5, 5.2
See application file for complete search history.

(56) References Cited

U.S. PATENT DOCUMENTS

| | | |
|---|---|---|
| 2013/0024799 A1 | 1/2013 | Fadell et al. |
| 2014/0062334 A1 | 3/2014 | Nagazoe et al. |

FOREIGN PATENT DOCUMENTS

| | | |
|---|---|---|
| KR | 1020120079539 A | 7/2012 |
| KR | 1020140125174 A | 10/2014 |
| KR | 101553503 B1 | 9/2015 |

* cited by examiner

FIG. 2
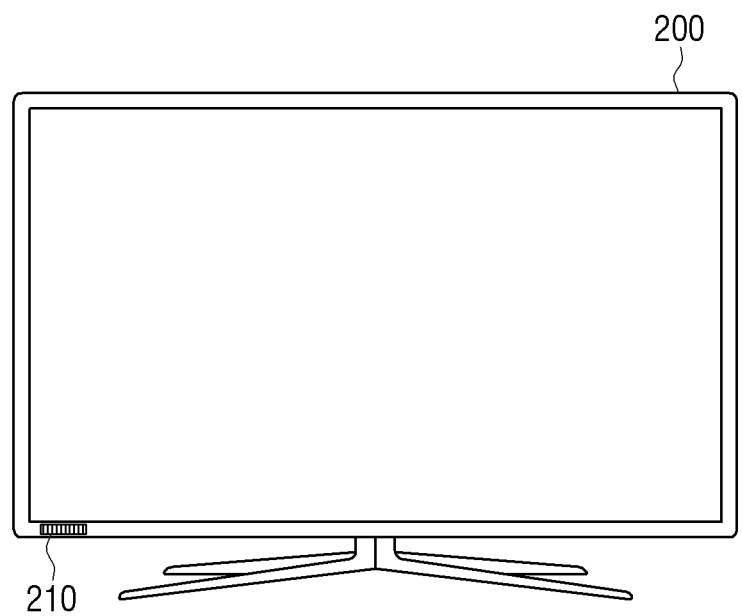
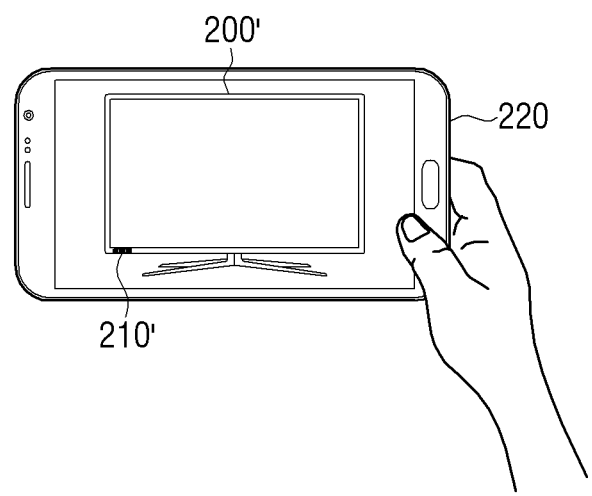

DISPLAY APPARATUS, SYSTEM, AND METHOD FOR CONTROLLING AN EXTERNAL DEVICE

CROSS-REFERENCE TO RELATED APPLICATION

This application claims priority from Korean Patent Application No. 10-2016-0040408, filed on Apr. 1, 2016 in the Korean Intellectual Property Office, the disclosure of which is incorporated herein by reference in its entirety.

BACKGROUND

1. Field

Devices and methods consistent with exemplary embodiments relate to a display apparatus for controlling an external device, a system, and a controlling method thereof.

2. Description of the Related Art

Due to the development of electronic technology, various types of electronic products have been developed and popularized. For example, various display apparatuses such as televisions (TVs), mobile phones, personal computers (PCs), smartphones, tablets, and personal digital assistants (PDAs) have been widely used in most ordinary households.

As the use of display apparatuses has increased, user needs for more diverse functions have also increased. Particularly, since it is possible to transmit and receive information among various electronic devices, there is an increasing need to control other electronic devices through one electronic device.

For example, a user can control external electronic devices such as air conditioners, televisions, audio speakers, and other electronic devices via smart phones or wearable electronic devices.

However, a user interface that is currently used has a disadvantage in that it lacks intuitiveness which allows a user to make recognition easily. In addition, the user interface currently being used has a disadvantage in that it does not reflect changes in the environment because it provides a uniformized integrated control window. For example, when the position of an external electronic device is changed, or when an external electronic device is removed, the user has to set the position of the external electronic device directly or delete the external electronic device item, which causes inconvenience.

SUMMARY

An aspect of the exemplary embodiments relates to a display apparatus configured to control an external device through an image of at least one external device, a system and a controlling method thereof.

According to an aspect of an exemplary embodiment, there is provided a display apparatus configured to control at least one external device to which an identification marker is attached, including a display, an image pickup unit or imaging sensor configured to obtain an image regarding the at least one external device, a communicator or communication circuit configured to perform communication with at least one of a server and the external device, and a processor configured to transmit identification information obtained from an identification marker included in the image, and in response to control information for controlling the external device being received from the server or at least one external device, control the display to match and display an object for controlling the external device with an external device image based on the received control information.

The control information may include at least one of a current state of the external device, a control parameter of the external device, a title of the external device, software for controlling the at least one external device, and information on an object for controlling the external device.

The control parameter of the at least one external device may include at least one of a type of control function, a control range and control accuracy for each type.

The object information may include at least one of a switch image for controlling the external device, a button image for controlling the external device and a remote control image for controlling the external device.

The apparatus may further include an input unit configured to receive a user input, and the processor, in response to the user input regarding the object being received, may generate a control command corresponding to the user input based on the control parameter of the external device and transmits the generated control command to the external device.

The object may be an image operable to respond to the user input, and the processor may generate the control command corresponding to an operation state of the object and transmit the generated control command to the external device.

The processor may generate and cause a user interface screen to be displayed for controlling and managing the external device with which the generated object is matched.

According to an aspect of another exemplary embodiment, there is provided a system including a server and a display apparatus, including a display apparatus configured to obtain an image of a plurality of external devices to which an identification marker is attached, to each respective external device of the plurality of external devices, and transmit identification information obtained from a plurality of identification markers included in the image, and a server configured to receive the identification information and in response, transmit control information for controlling each of the plurality of external devices corresponding to each respective external device of the received plurality of identification information to the display apparatus, and the display apparatus matches and displays a plurality of objects for controlling each of the plurality of external devices with a corresponding one of the plurality of external device images based on the received control information.

According to an aspect of another exemplary embodiment, there is provided a controlling method of a display apparatus for controlling at least one external device to which an identification marker is attached, including obtaining an image of the at least one external device, transmitting identification information obtained from an identification marker included in the image to a server, and receiving control information for controlling the external device from the server, and matching and displaying an object for controlling the external device with the external device image based on the control information received from the server.

The control information may include at least one of a current state of the external device, a control parameter of the external device, a title of the external device, software for controlling the external device, and information on an object for controlling the external device.

The control parameter of the external device may include at least one of a type of control function, a control range and control accuracy for each type.

The object information may include at least one of a switch image for controlling the external device, a button image for controlling the external device and a remote control image for controlling the external device.

The method may further include receiving a user input directed to the object and generating a control command corresponding to the user input based on the control parameter for the external device corresponding to the object, and transmitting the generated control command to the external device.

The object may be an image operable to respond to the user input, and the transmitting may include generating the control command corresponding to an operation state of the object and transmitting the generated control command to the external device.

The displaying may include generating and displaying a user interface screen for controlling and managing the external device with which the object is matched.

According to an aspect of another exemplary embodiment, there is provided a controlling method of a system including a server and a display apparatus, including obtaining an image of a plurality of external devices to which an identification marker is attached, respectively, by the display apparatus, transmitting control information for controlling each of the plurality of external devices corresponding to each of the received plurality of identification information to the display apparatus, by the server, and matching and displaying a plurality of objects for controlling each of the plurality of external devices with each of the plurality of external device images based on the received control information, by the display apparatus.

According to the above-described various exemplary embodiments, a user can directly view an image and control an external device, thereby providing excellent intuitiveness and enhancing user convenience.

BRIEF DESCRIPTION OF THE DRAWINGS

The above and/or other aspects of the exemplary embodiments will be more apparent with reference to the accompanying drawings, in which:

FIGS. 2 and 3 are views provided to illustrate an image regarding an external device according to an exemplary embodiment;

DETAILED DESCRIPTION OF EXEMPLARY EMBODIMENTS

Hereinafter, exemplary embodiments will be described in greater detail with reference to the accompanying drawings.

Figure 1:
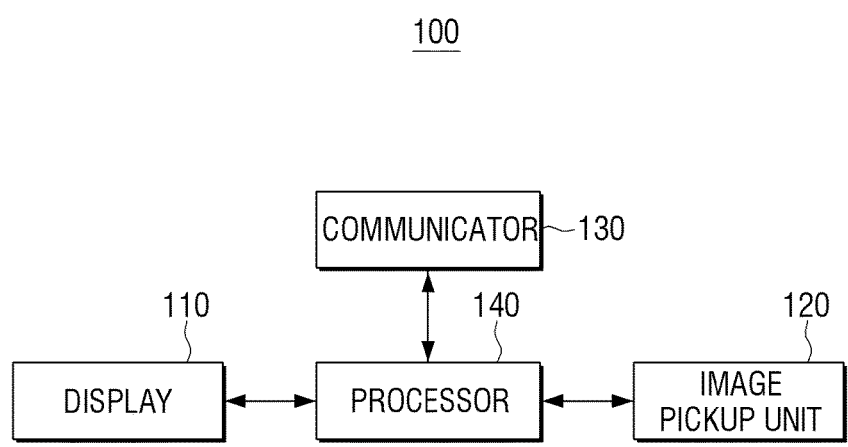
FIG. 1 is a block diagram illustrating a configuration of a display apparatus according to an exemplary embodiment.

FIG. 1 is a block diagram illustrating a configuration of a display apparatus 100 according to an exemplary embodiment.

Referring to FIG. 1, a display apparatus 100 includes a display 110, an image pickup unit 120 (e.g., imaging sensor), a communicator 130 (e.g., communication circuitry), and a processor 140. Here, the display apparatus is an electronic apparatus for controlling at least one external device to which an identification marker is attached, and may be implemented as various electronic apparatuses such as a TV, an electronic blackboard, an electronic table, a Large Format Display (LFD), a smart phone, a tablet PC, a desktop PC, a notebook PC, a set-top box, a smart watch, a wearable device, or another type of electronic device with a display.

In addition, the display 110 may display broadcast programs or various contents, and may be implemented as a Liquid Crystal Display (LCD), an Organic Light Emitting Display (OLED), a Plasma Display Panel (PDP), or another type of display. In addition, the display 110 according to an exemplary embodiment may display an image with which an object for controlling at least one external device is matched, or a user interface screen.

The image pick-up unit 120 may obtain an image regarding at least one external device, and may be implemented as a camera, a lens, an infrared ray sensor, or another type of imaging device.

The communicator 130 may perform communication with at least one of a server and an external device, and may perform communication with an Access Point (AP) using various communication methods such as Bluetooth (BT), Wireless Fidelity (WI-FI), Zigbee, 3G, LTE, Infrared (IR), Serial Interface, Universal Serial Bus (USB), Ethernet, Near Field Communication (NFC), etc.

In particular, an external device and a display apparatus according to an exemplary embodiment may be connected to an AP. Here, the term "AP" means a small-output wireless device serving as a base station in a wireless LAN that acts as a bridge between wired communication hardware and wireless communication hardware. The AP may be implemented in a router or a switch from the perspective of the wired network and accordingly, the AP may expand the wired network to the wireless network. For example, the AP may be implemented as an IP sharer connected to a modem, a wireless network card, or the like. That is, as the communicator 130 performs communication with the AP, the communicator 130 may also perform communication with another external device or a server connected to the AP via the AP. Of course, the communicator 130 may directly communicate with another external device or server through WIFI Direct, or other communication methods.

The processor 140 may transmit identification information obtained from an identification marker included in an image to a server, and control the display 110 to match and display an object for controlling an external device with an external device image based on control information once the control information for controlling an external device is received from the server. Additionally or alternatively, the control information could be received from the external device.

Here, the external device can be connected to the display apparatus 100 through short-distance communication or wireless communication, and is defined as a controllable object. Each of the external devices is provided with an identification marker for allowing the external device to be identified when the external device is photographed through the image pickup unit 120 provided in the display apparatus 100. Such an identification marker may be implemented in a form including information for enabling each external device to be identified, such as a bar code form, a QR code form, or a serial number.

Accordingly, when the display apparatus 100 obtains an image regarding at least one external device through the image pickup unit 120, not only the external device, but also an identification marker associated with the external device are included in the obtained image.

The processor 140 may obtain identification information of the external device from the identification marker included in the image. For example, the processor 140 may obtain the identification information of the external device from the identification marker included in the image based on a lookup table where the identification marker and the corresponding identification information are stored.

In addition, if there are a plurality of external devices, the display apparatus 100 may obtain one image regarding the plurality of external devices through the image pickup unit 120, and the obtained image may include a plurality of identification markers. The processor 140 may obtain identification information regarding each of the plurality of external devices from the plurality of identification markers included in the obtained image, which will be described in detail with reference to FIGS. 2 and 3.

Figure 3:
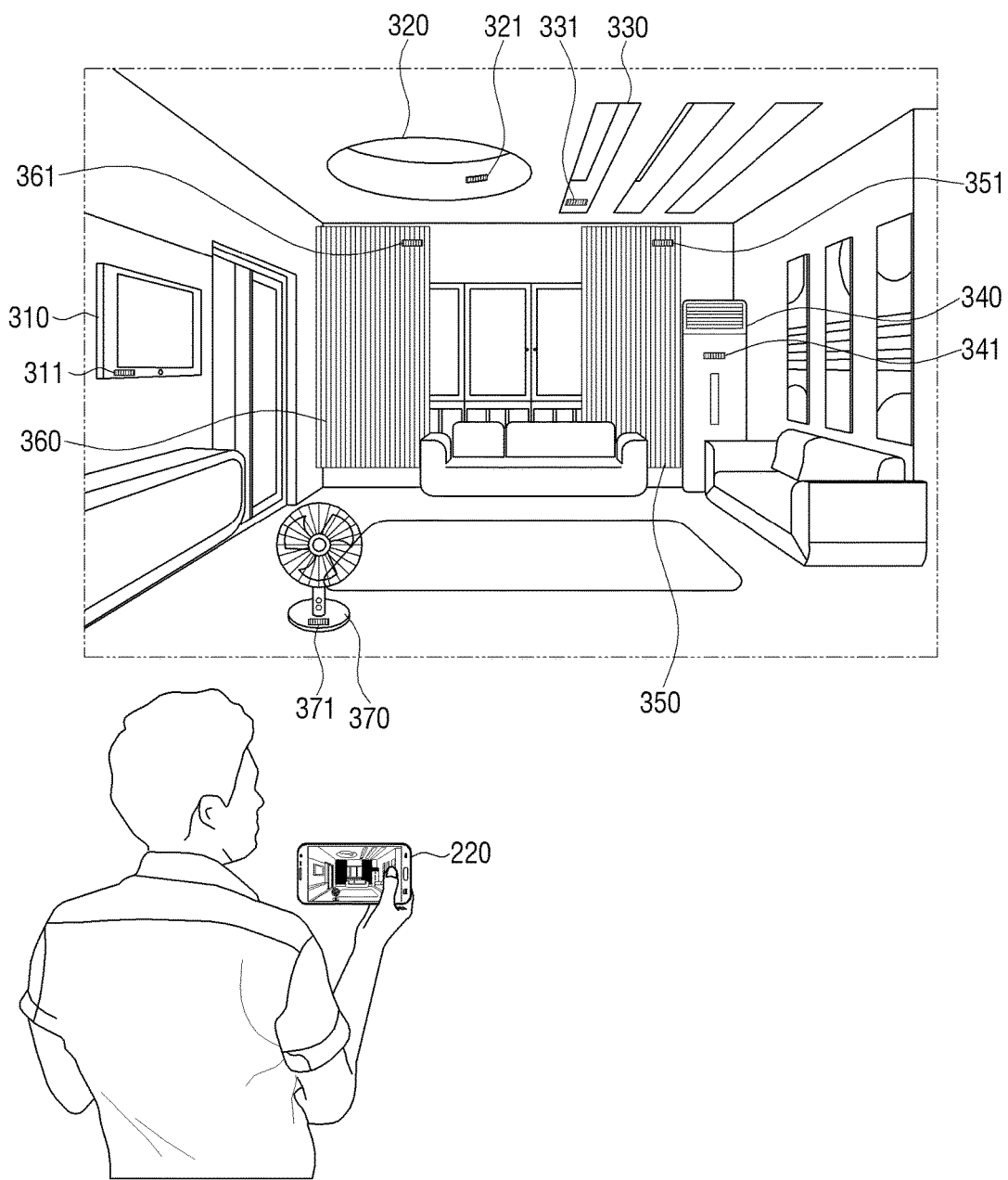

FIGS. 2 and 3 are views provided to illustrate an image regarding an external device according to an exemplary embodiment.

FIG. 2 illustrates that a user may take photographs of a TV 200 using a smart phone 220. Here, the smart phone 220 corresponds to the display apparatus 100 of an exemplary embodiment, and the TV 200 corresponds to the external device.

The TV 200 is provided with an identification marker 210 for identifying the TV. Accordingly, when an image is obtained through the smart phone 220, the obtained image includes an image 200' for the TV and an image 210' for the identification marker. However, in this embodiment, the image 200' for the TV is defined as a TV included in the obtained image, and the image 210' for the identification marker is defined as an identification marker included in the obtained image.

Accordingly, the processor 140 may obtain identification information for the TV 200 from the identification marker 210 included in the obtained image. For example, the processor 140 may obtain identification information for the TV 200 corresponding to the identification marker 210' included in the obtained image based on a lookup table where the identification marker and the corresponding identification information are stored.

Meanwhile, as shown in FIG. 2, a user may photograph only one external device using the display apparatus 100. However, a user may also photograph a plurality of external devices at once by including them in one image as shown in FIG. 3.

Regarding the above, FIG. 3 illustrates a case where a user photographs a living room view in a house using the smart phone 220. Various external devices such as a TV 310, a first lamp 320, a second lamp 330, an air conditioner 340, a first curtain 350, a second curtain 360, and a fan 370 are disposed in the living room.

Each of the external devices is provided with an identification marker. Specifically, an identification marker 311 for identifying the TV is attached to the TV 310, an identification marker 321 for the first lamp is attached to the first lamp 320, an identification marker 331 for identifying the second lamp is attached to the second lamp 330, an identification marker 341 for identifying the air conditioner is attached to the air conditioner 340, an identification marker 351 for identifying the first curtain is attached to the first curtain 350, an identification marker 361 for identifying the second curtain is attached to the second curtain 360, and an identification marker 371 for identifying the fan is attached to the fan 370.

Accordingly, the processor 140 may obtain identification information for the TV 310, the first lamp 320, the second lamp 330, the air conditioner 340, the first curtain 350, the second curtain 360, and the fan 370 from the plurality of identification markers (that is, the identification markers 311, 321, 331, 341, 351, 361, 371 attached to each external device) included in the image of the living room view.

The processor 140 may transmit the obtained identification information to a server through the communicator 130, and may receive control information for controlling external devices from the server. Alternatively, the processor could receive control information from one of the external devices, if the external device is configured to be able to transmit such control information. For example, a smart TV may be able to transmit control information.

Here, the control information may include at least one of a current state of the external device, a control parameter of the external device, software for controlling the external device, or a title of the external device and information on an object for controlling the external device.

Specifically, the current state of the external device may include information such as whether the external device is currently operating, the current temperature setting if the external device is an air conditioner, or how much the curtain is currently opened if the external device is a curtain.

The control parameter of the external device includes at least one of a type of control function, a control range, and control accuracy for each type.

For example, if the external device is a lamp, the type of control function included in the control parameter of the lamp may be an ON/OFF control for the lamp, the control range of each type may be 0 or 1 (0 corresponds to OFF, and 1 corresponds to ON), and the control accuracy for each type may be 1 which is the difference between 0 and 1.

If the external device is a fan, the type of control function included in the control parameter of the fan is an ON/OFF control of the air volume, an ON/OFF control of the wind direction, and a timer setting. The control range of each type may be: for air volume, 1 to 4 steps, for wind direction, 0 to 180 degrees, for the timer, 0 to 360 minutes, and an ON/OFF control of the fan. The control accuracy of each type may be controlled by one step in the case of air volume, by 10 degrees in the case of the wind direction, and by 1 minute in the case of the timer, and in terms of the ON/OFF control of the fan, 0 may correspond to OFF and 1 may correspond to ON.

If the external device is a temperature controller, the type of control functions included in the control parameter of the temperature controller may be temperature control and a timer setting, and the control range of each type may be 18-30 degrees for temperature, and 0 to 24 hours for the timer setting. The control accuracy for each type may be controlled by 0.5 degree in the case of the temperature and 1 minute in the case of the timer setting.

If the external device is a curtain, the type of control function included in the control parameter of the curtain may be the function of controlling movement of the curtain to the left or right. The control range of each type may be 0 when moving to the left, or 1 when moving to the right, and the control accuracy for each type can be 1 which is the difference between 0 and 1.

As described above, the type of control function, the control range, and the control accuracy included in the control parameter of the external device may vary depending on the type of the external device.

The object information for controlling the external device is information necessary for the processor 140 to generate an object used for controlling the external device by combining object information with an image, and the image includes at least one of a switch image for controlling the external device, a button image for controlling the external device, and a remote control image for controlling the external device.

For example, the switch image for controlling the external device may be a switch image displaying ON/OFF to change the ON/OFF state of the lamp. The button image for controlling the external device may be a button image displaying the direction for moving the curtain in the left or right, and the remote control image for controlling the external device may be an remote control image displaying a function key. The button image, and the remote control image for controlling the external device, may be a remote control image displaying a function key for controlling a TV or an air conditioner.

In addition, the object information for controlling the external device may include 3D model information, and such 3D model information may be used in implementing an augmented reality. The switch image for controlling the external device, the button image for controlling the external device and the remote control image for controlling the external device may be composed of one image, but they may be composed of a plurality of images to represent the state change according to an operation.

In addition, the external device may be assigned a specific label. In general, a label such as "TV," "air conditioner," "temperature controller," "fan," or the like may be assigned to corresponding type of device. Alternatively, a label selected by a user may be assigned to the external device.

Meanwhile, the processor 140 may generate an object for controlling the external device based on control information received from a server, and control the display 110 to match and display the generated object with an external device image. Here, the external device image is defined as the external device included in the image.

Specifically, the processor MO may generate an object for controlling the external device based on at least one of the current state of the external device, the control parameter of the external device, the title of the external device, and the object information for controlling the external device.

For example, based on the current state of the external device, the processor 140 may determine whether the external device is currently operating, and in which state the device is operating. The processor 140 may also determine how the external device is to be controlled in accordance with a method based on the control parameter of the external device. The processor 140 may also determine how the object for controlling the external device is to be configured based on the object information for controlling the external device, thereby generating an object for controlling the external device.

For example, if the external device is a temperature controller and the current set temperature is 20 degrees, the processor 140 may determine that the temperature controller is currently operating and the set temperature is 20 degrees based on the current state of the temperature controller. The processor 140 can then determine that the temperature controller can be adjusted from 18 degrees to 30 degrees in 0.5 degree increments, and that the timer can be adjusted in units of 1 hour within the range of 0 to 24 hours based on the control parameter of the temperature controller. The processor 140 can also and determine whether to configure an object in the form of a remote controller for controlling the temperature controller based on the object information for controlling the temperature controller. Accordingly, the processor 140 may generate an object in the form of a remote controller indicating that the temperature controller is currently operating, the set temperature is 20 degrees, the temperature adjustment range is from 18 degrees to 30 degrees in 0.5 degree increments, and the timer can be adjusted in units of 1 hour within the range of 0 to 24 hours.

The process of receiving and transmitting information between the display apparatus 100 and a server will be described in detail with reference to FIG. 4.

Figure 4:
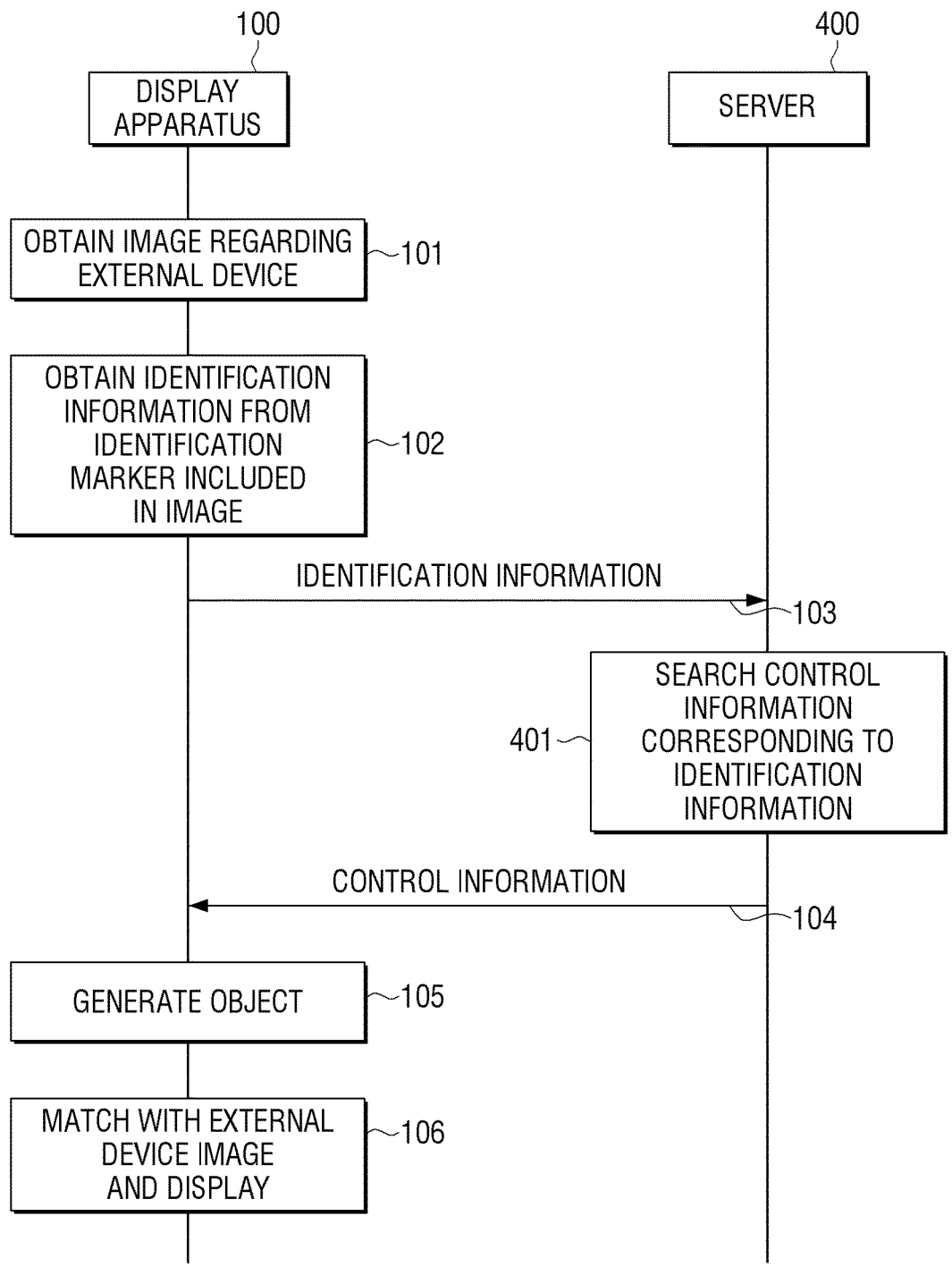
FIG. 4 is a timing view provided to illustrate a process of transmitting and receiving information between a display apparatus and a server according to an exemplary embodiment.

FIG. 4 is a timing view provided to illustrate a process of transmitting and receiving information between a display apparatus and a server according to an exemplary embodiment.

Referring to FIG. 4, if a user photographs an image using the display apparatus 100, the display apparatus 100 obtains an image regarding an external device (101) and obtains identification information from an identification marker included in the image (102).

After obtaining the identification information from the identification marker, the display apparatus 100 transmits the obtained identification information to a server 400 (103).

Subsequently, the server 400 searches database for control information corresponding to the identification information (401) and transmits the retrieved control information to the display apparatus 100 (104).

The display apparatus 100 generates an object based on the received control information (105) and matches and displays the generated object with an external device image (106).

Meanwhile, the processor 140 may match each generated object with each external device image and display each generated object on the display 110, which will be described in detail with reference to FIG. 5.

Figure 5:
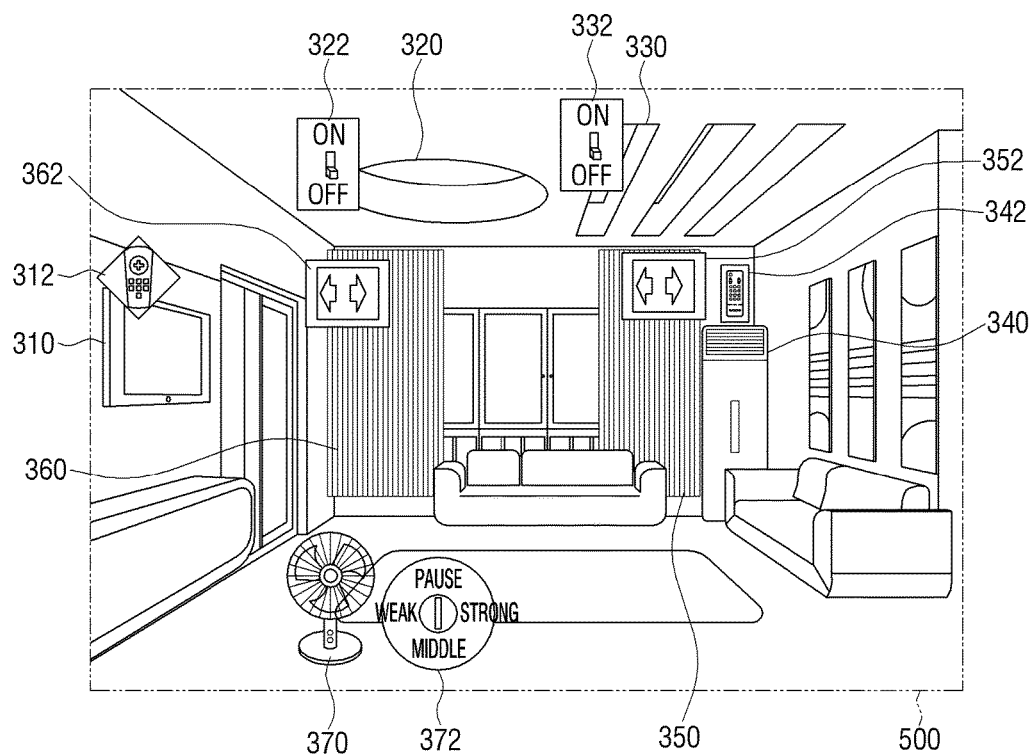
FIG. 5 is a view illustrating that an object is matched with each of a plurality of external device images according to an exemplary embodiment.

FIG. 5 is a view illustrating that an object is matched with each of multiple external device images according to an exemplary embodiment.

Referring to FIG. 5, as described above with reference to FIG. 3, the processor 140 may obtain identification information of various external devices in the living room (merely by way of example, a TV 310, a first lamp 320, a second lamp 330, an air conditioner 340, a first curtain 350, a second curtain 360, and a fan 370) from identification markers, transmit the obtained identification information to a server, match an object for controlling the various external devices (the TV 310, the first lamp 320, the second lamp 330, the air conditioner 340, the first curtain 350, the second curtain 360, and the fan 370) with each external device image based on the control information, once the control information is received, and display an image 500 similar to the image in FIG. 5.

For example, the processor 140 may generate a remote control image 312 for controlling the TV 310 and match and display the remote control image 312 with the TV 310, generate a switch image 322 for controlling the first lamp 320 and match and display the switch image 322 with the first lamp 320, generate a switch image 332 for controlling the second lamp 330 and match and display the switch image 332 with the second lamp 330, generate a remote control image 342 for controlling the air conditioner 340 and match and display the remote control image 342 with the air conditioner 340, generate a button image 352 for controlling the first curtain 350 and match and display the button image 352 with the first curtain 350, generate a button image 362 for controlling the second curtain 360 and match and display the button image 352 with the second curtain 360, and generate a dial switch for controlling the fan 370 and match and display the dial switch image 372 with the fan 370.

In addition, the processor 140 may implement and display the image 500 shown in FIG. 5 as a user interface screen for controlling and managing external devices matched with the generated objects. This user interface screen may provide a user with a editing function for fine-adjusting the generated objects, such as the remote control images 312 and 342, the switch images 322 and 332, the button images 352 and 362, and the dial switch image 372. In addition, such a user interface screen may be realized as an augmented reality image by performing real-time processing and utilized in aa head-mounted display, a smart phone, or another type of electronic device configured to display augmented reality images.

If a user selects an object, the processor 140 may enlarge and display the object so that the user can easily operate the object. The processor 140 may also display the object in more detail when it is enlarged so that more functionality, such as additional virtual buttons, are available when the object is enlarged.

Figure 6:
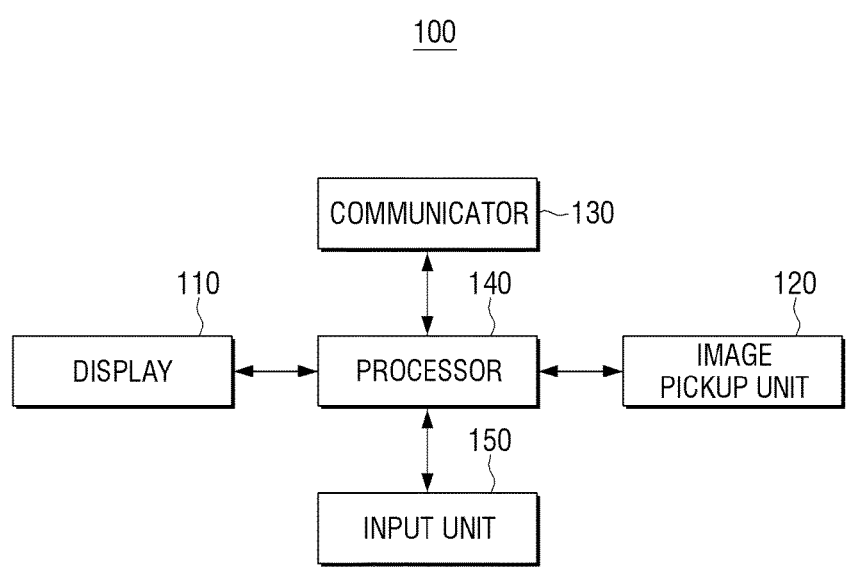
FIG. 6 is a view illustrating a configuration of a display apparatus 100 according to another exemplary embodiment.

FIG. 6 is a view illustrating a configuration of the display apparatus 100 according to another exemplary embodiment.

Referring to FIG. 6, the display apparatus 100 includes the display 110, the image pickup unit 120, the communicator 130, the processor 140, and an input unit 150. Here, the display 110, the image pickup unit 120, the communicator 130, and the processor 140 have been described above and thus, will not be described further.

The input unit 150 may receive a user input, and may be implemented as a touch panel that directly receives a touch input of a user. Alternatively, the input unit may be implemented as a signal receiving unit to receive a signal from a remote control device.

In addition, when a user input regarding an object is received, the processor 140 may generate a control command corresponding to the user input based on a control parameter of the external device corresponding to the object, and transmit the generated control command to the external device.

For example, when a user applies an operation to the object 322 for controlling the first lamp 320 on the image 500 shown in FIG. 5, the processor 140 may generate a control command corresponding to the operation input through the object for controlling the first lamp 320 based on the control parameter of the first lamp 320 corresponding to the object 322 for controlling the first lamp 320, that is, the type of control function (ON/OFF of the electric lamp), the control range for each type (0 or 1) and the control accuracy (1) for each type), and transmit the generated control command to the first lamp 320.

Specifically, the control command corresponding to the user operation input through the object for controlling the first lamp 320 may include information regarding whether to turn the first lamp 320 on or off, and the information included in such a control command may vary depending on the type of the external device, the type of control function which changes according to the type of external device, the control range for each type, and the control accuracy for each type.

The object may be implemented as an operable image to correspond to a user input, and the processor 140 may generate a control command corresponding to the operation state of the object and transmit the generated control command to the external device.

Figure 7:
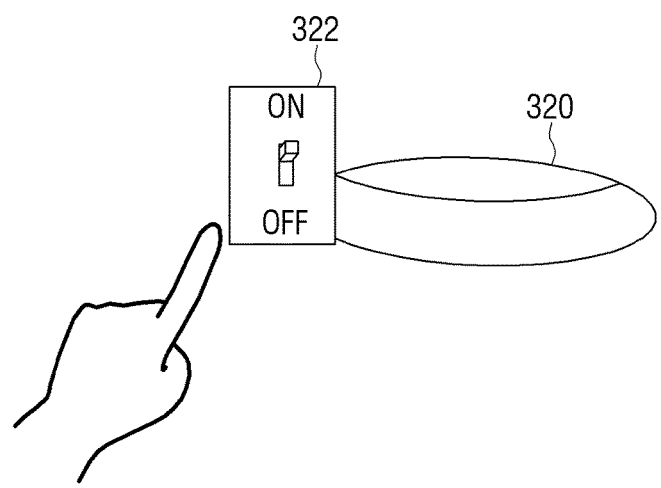
FIG. 7 is a view provided to illustrate an operation regarding an object according to an exemplary embodiment.

FIG. 7 is a view provided to explain an operation regarding an object 322 according to an exemplary embodiment.

For example, when the current state of the first lamp 320 is OFF, the object 322 for controlling the first lamp 320 may display that the switch is in an OFF position by reflecting the current state of the first lamp 320. In this case, if the user applies an input to turn on the first lamp 320 to the object 322, the processor 140 may change the object 322 such that the switch is disposed in an ON position in response to the user input, thereby allowing the object to be operable according to the user input. At the same time, the processor 140 may generate a control command to turn on the first lamp 320 and transmit the control command to the first lamp 320 to actually turn on the first lamp. In short, the object displayed on the display apparatus can be displayed in such a manner that its status corresponds to the status of the external device that it controls.

In FIG. 7, the object 322 for the first lamp 320 is described as an exemplary embodiment. However, each object for various external devices may be implemented as an image which is operable so as to correspond to a user input. For example, if a user operation for changing the channel is input to the object 312 for controlling the TV 310, the processor 140 may provide the effect of pressing a function key provided on the object 312 for controlling the TV 310.

In addition, the processor 140 may enlarge and display an object for controlling the external device according to a user operation to further enhance convenience of user operation.

Of course, the feature that the above-described object is embodied as an image that can be operated so as to correspond to a user input is equally applicable to an augmented reality system.

Figure 8:
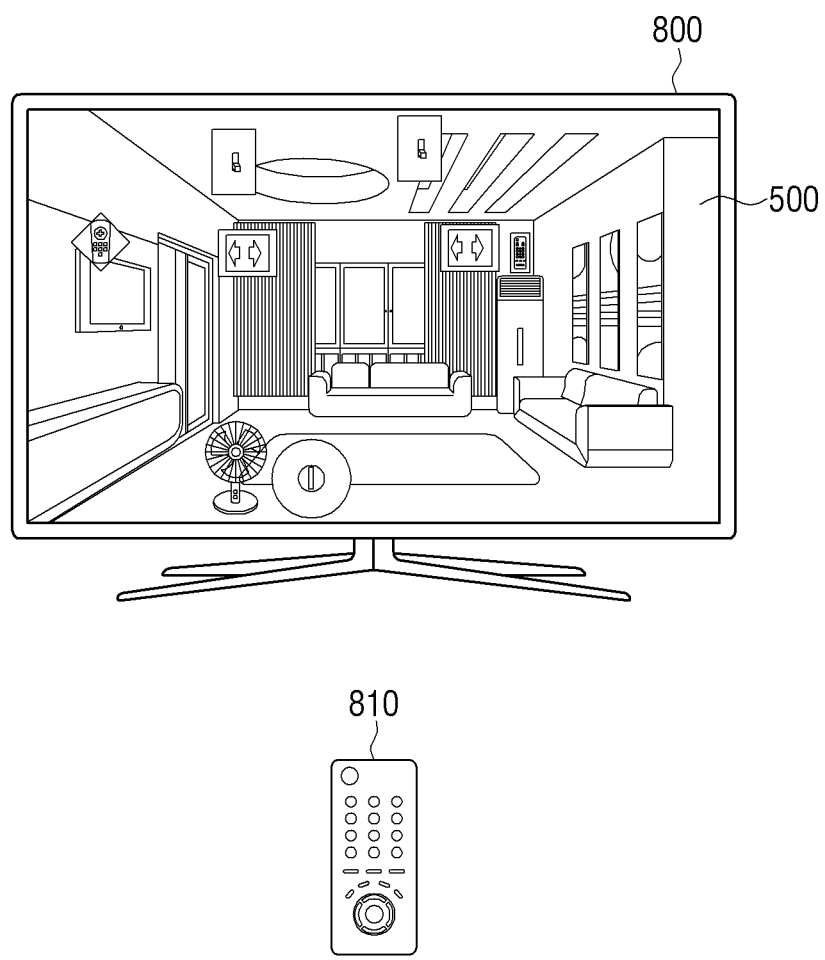
FIG. 8 is a view provided to illustrate a case where a display apparatus is implemented as a TV according to an exemplary embodiment.

FIG. 8 is a view provided to illustrate a case where a display apparatus is implemented as a TV according to an exemplary embodiment.

Referring to FIG. 8, the image 500 in which each of a plurality of objects for controlling external devices are matched with corresponding external device images may be provided on a TV 800, and a user may use a remote controller 810 to operate at least one object matched with each external device image.

For example, the user may use the remote controller 810 to select one of a plurality of objects included in the image 500 which is displayed on the TV 800, and by operating the selected object, the TV 800 may transmit a control command to control the external device to an external device corresponding to the selected object.

As such, the user may directly perform a touch input with respect to the image 500 in which the object for controlling the external device with the external device image to operate the object, and may operate the object using the remote controller 810. In this exemplary embodiment, the image may be obtained from a device other than the TV, and the image may then be transmitted to the TV. For example, a user could capture the image of the external objects with a smartphone.

Figure 9:
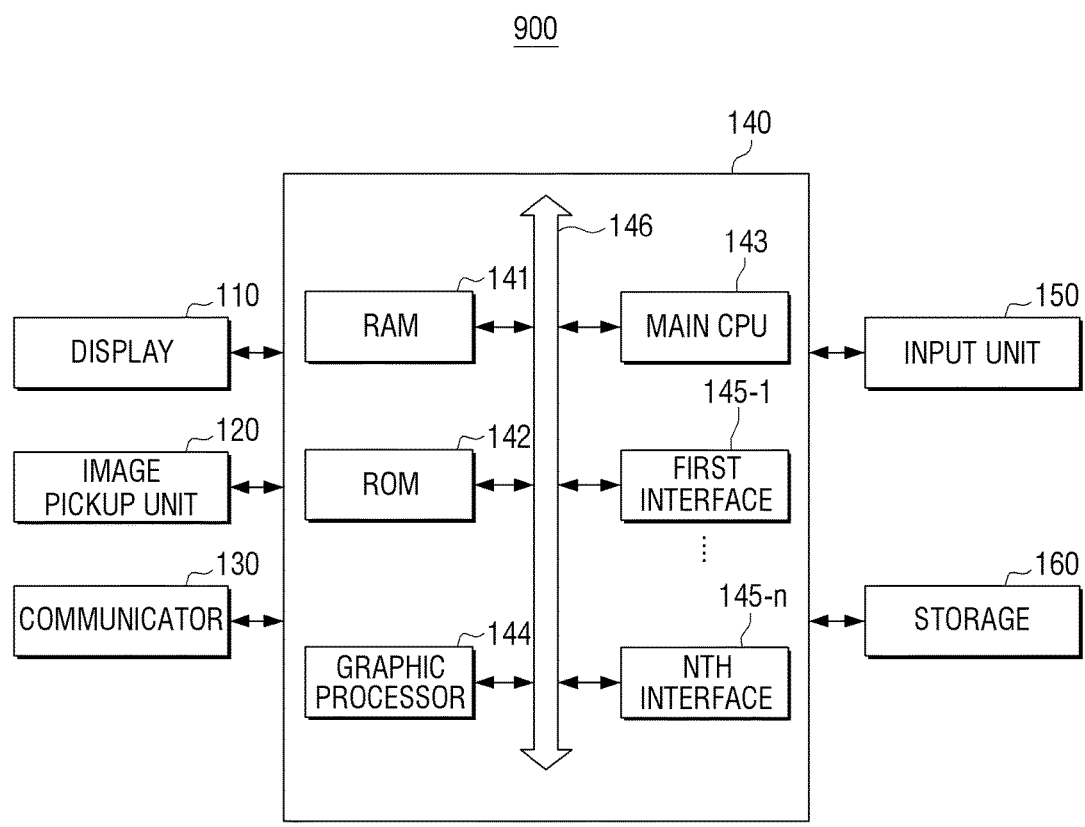
FIG. 9 is a block diagram illustrating a specific configuration of a display apparatus according to an exemplary embodiment.

FIG. 9 is a block diagram illustrating a specific configuration of a display apparatus 900 according to an exemplary embodiment.

Referring to FIG. 9, a display apparatus 900 includes a display 110, an image pickup unit 120, a communicator 130, a processor 140, an input unit 150, and a storage 160. The detailed description of the elements which have already been described above from among the elements of FIG. 9 will not be provided for the sake of brevity.

The processor 140 may control the overall operations of the display apparatus 900.

Specifically, the processor 140 includes a RAM 141, a ROM 142, a main CPU 143, a graphic processor 144, first to nth interfaces 145-1~145-n, and a bus 146.

The RAM 141, the ROM 142, the main CPU 143, the graphic processor 144, the firth to the nth interfaces 145-1~145-n, etc. may be connected to each other through the bus 146.

The first to the nth interfaces 145-1 to 145-n are connected to the above-described various elements. One of the interfaces may be a network interface which is connected with an external device via a network. At least one interface may be a wireless networking interface.

The main CPU 143 accesses the storage 160 and performs booting using an Operating System (O/S) stored on the storage 160, and performs various operations using various programs, contents, data, etc. stored on the storage 160.

In particular, the main CPU 143 may obtain identification information from an identification marker included in an image, generate an object for controlling the external device based on control information for controlling the external device, which is received from a server, and generate a control command corresponding to a user operation regarding the object.

The ROM 142 stores a set of commands for system booting. When a turn on command is input and power is supplied, the main CPU 143 copies the O/S stored in the storage 160 to the RAM 141 according to the command stored in the ROM 142, and executes the O/S to boot the system. When the booting is completed, the main CPU 143 copies various application programs stored on the storage 160 to the RAM 141, and performs various operations by executing the application programs copied to the RAM 141.

The graphic processor 144 generates a screen including various objects such as an icon, an image, a text, etc. using an operator (not illustrated) and a renderer (not illustrated). The operator (not illustrated) computes an attribute value, such as a coordinate value where each object is displayed, a form, a size, a color, and the like, according to a screen layout using a received control command. The renderer (not illustrated) generates a screen of various layouts including objects based on an attribute value calculated in the operator (not illustrated).

In particular, the graphic processor 144 may implement an object generated by the main CPU 143 as a Graphic User Interface (GUI), an icon, a user interface screen, or a virtual button or slider.

Additionally, the operations of the above-described processor 140 may be performed by a program stored in the storage 160.

The storage 160 stores various data such as an Operating System (O/S) software module to drive the display apparatus 900 and various multimedia contents.

In particular, the storage 160 may include a software module to obtain identification information from an identification marker included in the image, generate an object for controlling the external device based on control information for controlling the external device and execute a function of generating a control command corresponding to a user input which is input with respect to the object.

Figure 10:
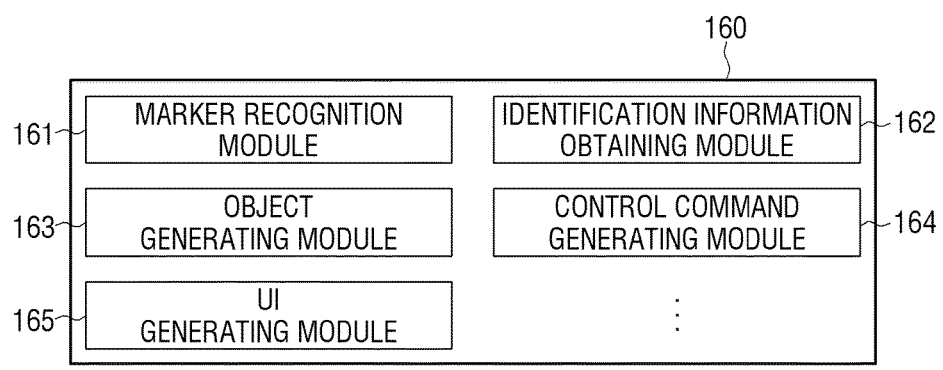
FIG. 10 is a view of a software module stored in a storage according to an exemplary embodiment.

FIG. 10 is a view regarding a software module stored in a storage 160 according to an exemplary embodiment.

Referring to FIG. 10, the storage 160 may store programs such as a marker recognition module 161, an identification information obtaining module 162, an object generating module 163, a control command generating module 164, a UI generating module 165, or other types of modules.

Meanwhile, the operations of the above-described processor 140 may be performed by a program stored in the storage 160. Hereinafter, the operations of the processor 140 using a program stored in the storage 160 will be described in detail.

Specifically, the marker recognition module 161 may perform the function of recognizing an identification marker attached to the external device included in the image. For example, the identification marker may be implemented in the form of a QR code, a bar code or a serial number, and the marker recognition module 161 may perform the function of detecting all identification markers included in the image.

The identification information obtaining module 162 may perform the function of obtaining identification information from the recognized identification markers.

The object generating module 163 may perform the function of generating an object for controlling the external device based on control information for controlling the external device.

The control command generating module 164 may perform the function of generating a control command corresponding to a user input based on the control parameter of the external device corresponding to the object once the user input regarding the object is received.

The UI generating module 165 may perform the function of generating a user interface screen for controlling and managing the external device with which the generated object is matched.

Figure 11:
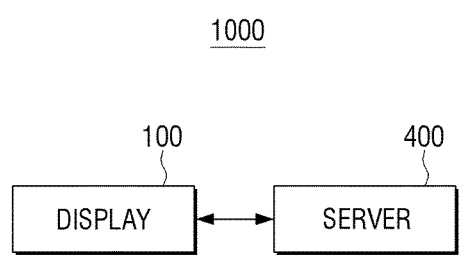
FIG. 11 is a block diagram illustrating a configuration of a system according to an exemplary embodiment.

FIG. 11 is a block diagram illustrating configuration of a system 1000 according to an exemplary embodiment.

Referring to FIG. 11, a system 1000 includes a server 400 and a display apparatus 100 which obtains an image regarding a plurality of external devices to which an identification marker is attached to each respective external device. The display apparatus 100 transmits a plurality of identification information datasets obtained from a plurality of identification markers included in the image, and the server 400 transmits control information for controlling each of the plurality of external devices corresponding to each of the received plurality of identification information datasets to the display apparatus. Here, the display apparatus 100 may match and display a plurality of objects for controlling each of the plurality of external devices with each of the plurality of external device images based on the received control information.

In other words, the display apparatus 100 may obtain one image including a plurality of external devices, obtain identification information of each of the plurality of external devices, generate a plurality of objects based on control information for controlling each of the plurality of external devices, and transmit a control command to each of the plurality of objects according to an individual user operation regarding at least one of the plurality of objects.

Figure 12:
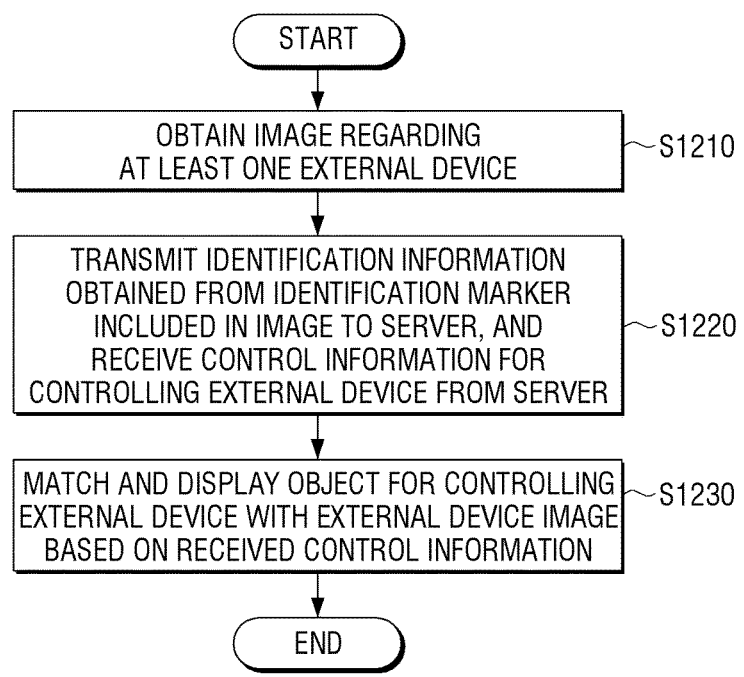
FIG. 12 is a flowchart provided to illustrate a controlling method of a display apparatus according to an exemplary embodiment.

FIG. 12 is a flowchart provided to illustrate a controlling method of a display apparatus according to an exemplary embodiment.

The controlling method of a display apparatus for controlling at least one external device to which an identification marker is attached in FIG. 12 includes obtaining an image regarding at least one external device (operation S1210).

Subsequently, the method includes transmitting the identification information obtained from the identification marker included in the image to a server, and receiving control information for controlling the external device from the server (operation S1220).

The method includes matching and displaying an object for controlling the external device with an external device image based on the received control information (operation S1230).

Here, the control information may include at least one of a current state of the external device, a control parameter of the external device, a title of the external device, and information on an object for controlling the external device.

The control parameter of the external device includes at least one of a type of control function, a control range, and control accuracy for each type.

The object information may include at least one of a switch image for controlling the external device, a button image for controlling the external device, and a remote control image for controlling the external device.

Meanwhile, the controlling method of a display apparatus according to an exemplary embodiment may further include receiving a user input regarding an object, generating a control command corresponding to the user input based on the control parameter of the external device corresponding to the object, and transmitting the generated control command to the external device.

Here, the object is an image operable to correspond to the user input, and the step of transmitting may include generating a control command corresponding to an operation state of the object and transmitting the generated control command to the external device.

The step of displaying may include generating and displaying a user interface screen for controlling and managing the external device with which the generated object is matched.

Figure 13:
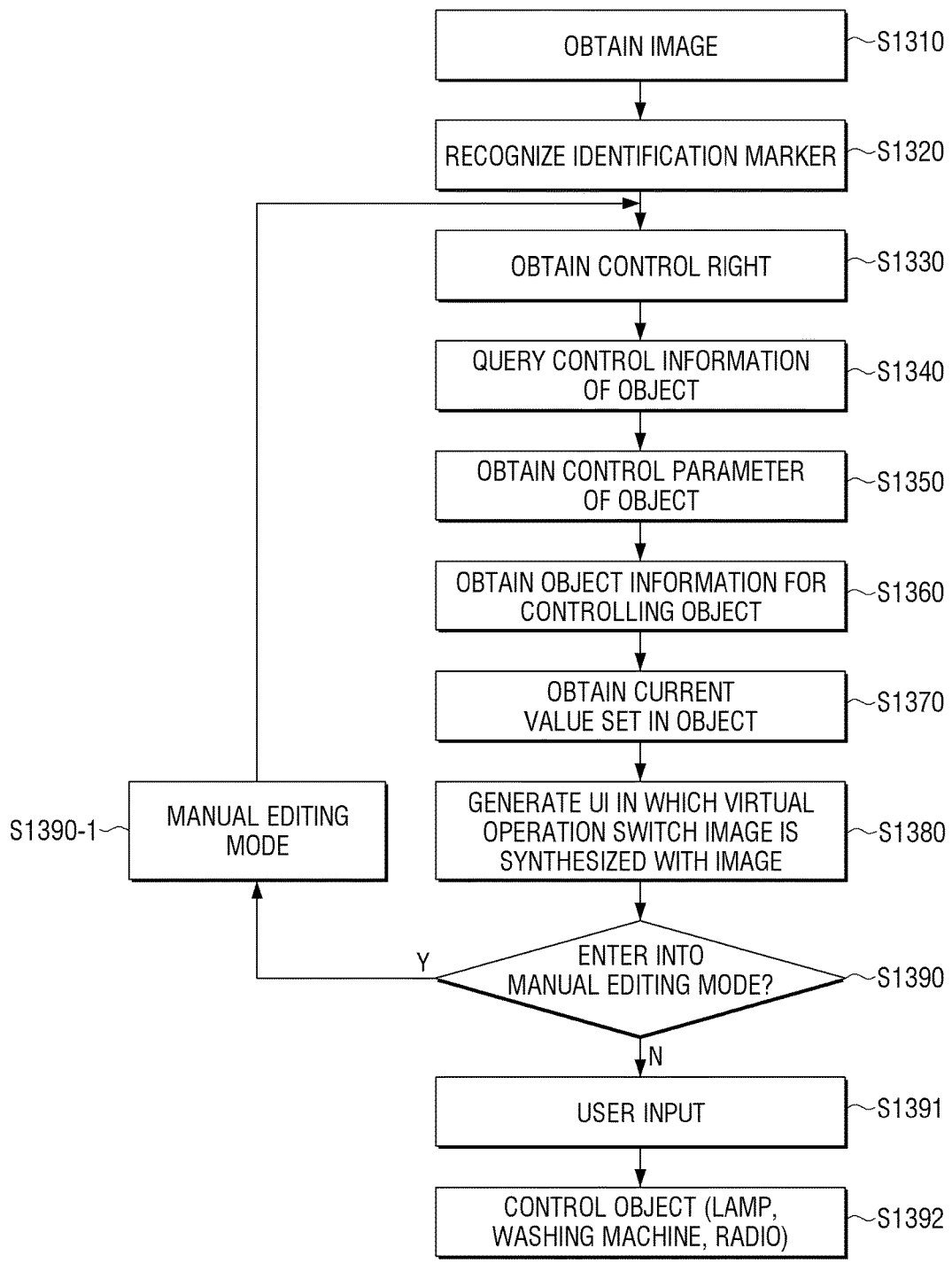
FIG. 13 is a flow chart provided to illustrate a specific controlling method of a display apparatus according to an exemplary embodiment.

FIG. 13 is a flow chart provided to illustrate a specific controlling method of a display apparatus according to an exemplary embodiment.

Referring to FIG. 13, the display apparatus 100 may obtain an image (operation S1310), recognize an identification marker included in the image (operation S1320), and perform control acquisition (operation S1330). Here, the control acquisition (operation S1330) is for limiting the authority to photograph and control an image regarding an external device arbitrarily by a third party other than a designated user. Only the designated user who performs user authentication through a user account may acquire the control right regarding the external device.

The display apparatus 100 may query the server for control information of an object (external device) (operation S1340), obtain a control parameter of the object based on the control information received from the server (operation S1350), obtain object information for controlling the object (operation S1360), and obtain the current value set in the object (operation S1370).

The display apparatus 100 may generate a UI in which a virtual operation switch image is synthesized with an image (operation S1380).

The display apparatus 100 may determine an entry into a manual editing mode (operation S1390). Specifically, if an identification marker attached to any one of the objects is not accurately captured by the image so that the display apparatus 100 cannot recognize the identification marker, the display apparatus 100 enters the manual editing mode (operation S1390-1) to add information regarding the identification marker which is not recognized according to a user operation directly to the storage 160 of the display apparatus 100.

When the position of the object is changed, the display apparatus 100 may enter the manual editing mode (operation S1390-1) to change the position of the object in the image according to a user operation regarding the change of the position of the object.

In addition, the display apparatus 100 may enter the manual editing mode (operation S1390-1) and perform control acquisition (operation S1320) when recognition of the identification marker is completed.

Meanwhile, when a user input regarding the generated UI is received (operation S1391), the display device 100 may transmit a control command corresponding to the user input to the object to control an object (for example, a lamp, a washing machine, a radio, etc.) (operation S1392).

Figure 14:
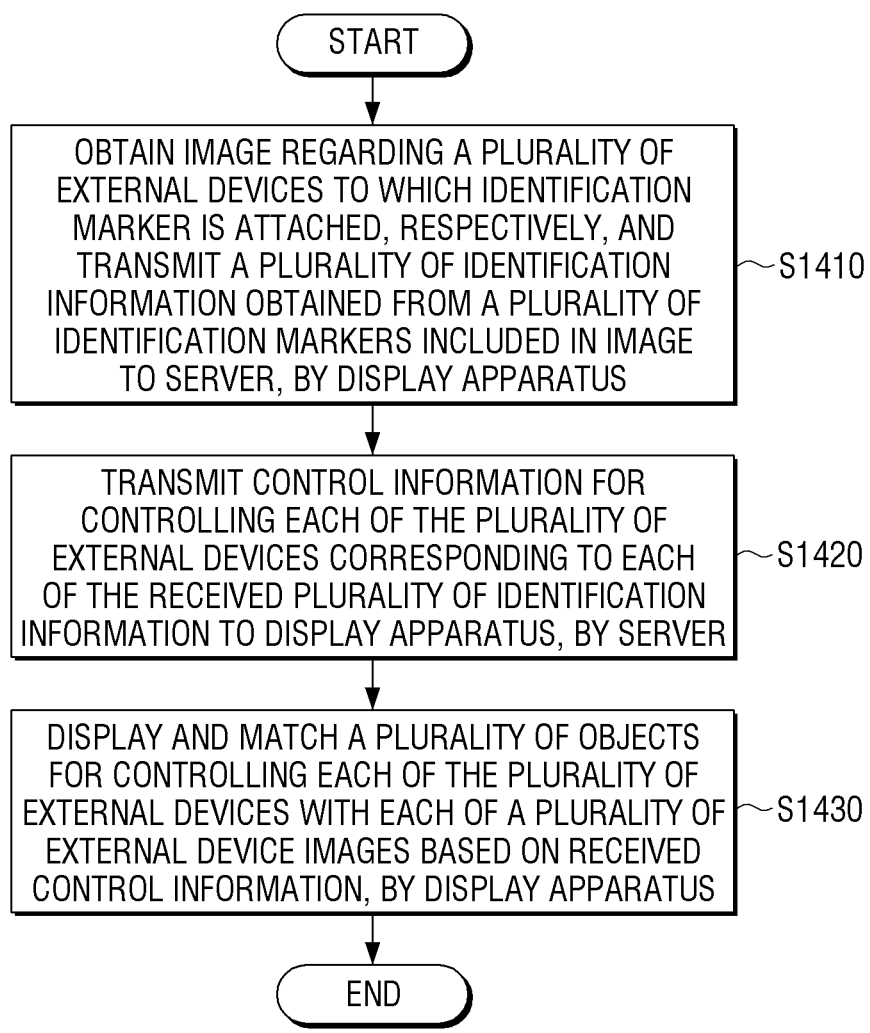
FIG. 14 is a flowchart provided to illustrate a controlling method of a system according to an exemplary embodiment.

FIG. 14 is a flowchart provided to illustrate a controlling method of a system according to an exemplary embodiment.

The controlling method of a system that includes a server and a display apparatus as shown in FIG. 14 includes obtaining, with the display apparatus, an image regarding a plurality of external devices to which an identification marker is attached, respectively. The method also includes transmitting a plurality of identification information datasets obtained from a plurality of identification markers included in the image to a server (operation S1410), and the server transmits control information for controlling each of the plurality of external devices corresponding to each of the received plurality of identification information to the display apparatus (operation S1420). The display apparatus matches and displays a plurality of objects for controlling each of the plurality of external devices with each of a plurality of external device images based on the received control information (operation S1430).

Additionally, a non-transitory computer readable medium in which a program for performing a controlling method sequentially according to an exemplary embodiment may be provided.

The non-transitory computer readable medium refers to a medium that stores data semi-permanently rather than storing data for a very short time, such as a register, a cache, a storage, a memory or etc., and is readable by an apparatus. Specifically, the above-described various applications or programs may be stored and provided in a non-transitory computer readable medium such as a CD, a DVD, a hard disk, an SSD, a Blu-ray disk, a universal serial bus (USB), a memory card, a ROM, or the like.

Although a bus is not shown in the above-described block diagram of the display apparatus, communication between the respective components in the display apparatus may be performed through a bus. In addition, each device may further include a processor such as a CPU, a microprocessor, or the like that performs the above-described various steps.

The foregoing exemplary embodiments and advantages are merely exemplary and are not to be construed as limiting the exemplary embodiments. The present teaching can be readily applied to other types of apparatuses. Also, the description of the exemplary embodiments is intended to be illustrative, and is not meant to limit the scope of the claims.

What is claimed is:

1. A display apparatus comprising:
    a display;
    an imaging sensor;
    a communicator; and
    a processor configured to
    in response to an image including an external device to which an identification marker is attached being obtained by the imaging sensor, transmit to a server, via the communicator, identification information obtained from the identification marker included in the obtained image to receive control information for controlling the external device, the identification information being for identifying the external device, and
    in response to the control information for controlling the external device being received from the server, control the display to display the obtained image and a user interface (UI) element for receiving a user input to control the external device based on the control information, the UI element being displayed at a location corresponding to the external device in the obtained image.

2. The apparatus as claimed in claim 1, wherein the control information includes at least one of a current state of the external device, a control parameter of the external device, a title of the external device, software for controlling the external device, and information associated with the UI element for controlling the external device.

3. The apparatus as claimed in claim 2, wherein the control parameter of the external device includes at least one of a type of control function, a control range, and control accuracy for each type.

4. The apparatus as claimed in claim 2, wherein the information associated with the UI element includes at least one of a switch image for controlling the external device, a button image for controlling the external device, and a remote control image for controlling the external device.

5. The apparatus as claimed in claim 3, further comprising:
    an input unit,
    wherein the processor, in response to the user input regarding the UI element being received through the input unit, generates a control command corresponding to the user input based on the control parameter of the external device and transmits the generated control command to the external device.

6. The apparatus as claimed in claim 5,
    wherein the processor generates the control command corresponding to an operation state of the UI element and transmits the generated control command to the external device.

* * * * *